United States Patent [19]

Bell

[11] 3,754,571

[45] Aug. 28, 1973

[54] FLUID CONTROL VALVE ASSEMBLY

[75] Inventor: William E. Bell, Berkley, Mich.

[73] Assignee: General Motors Corporation, Detroit, Mich.

[22] Filed: Nov. 29, 1971

[21] Appl. No.: 202,918

[52] U.S. Cl.............................. 137/614.19, 92/24
[51] Int. Cl............................................. F15b 15/26
[58] Field of Search.................... 137/614.19, 614.2; 92/27, 28, 24; 188/170

[56] References Cited
UNITED STATES PATENTS

| | | | |
|---|---|---|---|
| 2,139,185 | 12/1938 | Engel................................. | 92/27 X |
| 2,495,151 | 1/1950 | Vickers.............................. | 92/28 X |
| 3,063,424 | 11/1962 | Kutsche............................. | 92/27 |
| 3,033,171 | 5/1962 | Engelbrecht et al............... | 82/27 X |
| 2,927,608 | 3/1960 | Jenkins et al..................... | 137/614.2 |

*Primary Examiner*—Samuel Scott
*Assistant Examiner*—Ira S. Lazarus
*Attorney*—W. E. Finken and D. D. McGraw

[57] ABSTRACT

A fluid control valve assembly in which the valve is normally held closed by suitable holding means controlled by a control member such as a brake pedal or the like, the holding means being movable, upon release, by releasing movement of the control member, through a range of movement away from the valve. The valve is urged open in opposition to the holding means by a fluid pressure differential generated by the presence of a fluid pressure to be vented through the valve when the valve is open, and if the fluid pressure differential is present when the holding means is moved away from the valve, the valve opens, and upon return movement of the holding means is held by the holding means against closure. When the fluid pressure differential is no longer generated and the holding means is again moved away from the valve, the valve is closed by valve closing means. Upon subsequent return movement of the holding means the valve is again held closed by the holding means.

2 Claims, 4 Drawing Figures

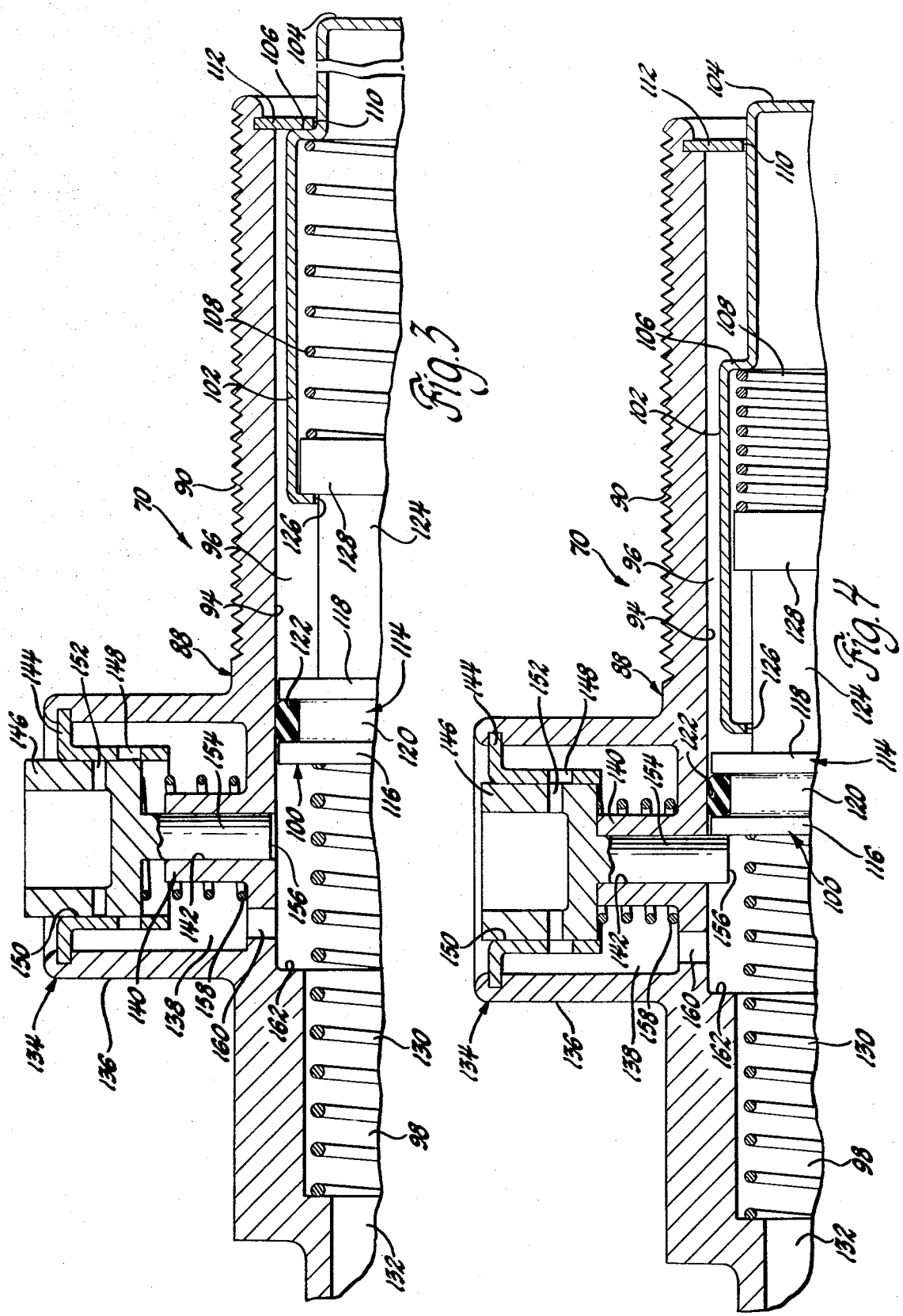

FLUID CONTROL VALVE ASSEMBLY

CROSS REFERENCE TO RELATED PRIOR ART

A road speed control system of the type in which a valve assembly embodying the invention may be used is disclosed in U.S. Pat. No. 3,419,105, entitled "Vehicle Road Speed Control System," issued Dec. 31, 1968, and assigned to the common assignee. A related valve assembly is disclosed in U.S. Pat. No. 3,451,651, entitled "Fluid Control Valve Assembly," issued June 24, 1969, and assigned to the common assignee.

SUMMARY OF THE INVENTION

The invention relates to a valve assembly for controlling the flow of fluid, and more particularly to a valve assembly which has a normally closed valve position and an open valve position, and means holding the valve closed during one condition of operation and holding the valve open during another condition of operation.

The valve assembly is particularly adapted for control of air pressures, one of which is atmospheric air pressure. In one of its contemplated uses the valve assembly is connected as part of a pneumatically operated vehicle road speed control system so that it acts as a spoiler valve to assure pneumatic deactivation of the system upon actuation of a vehicle control member such as the vehicle brake pedal. A valve assembly embodying the invention, when utilized in such a system, is so positioned as to be held closed while the vehicle brake pedal is in the released position and to be so actuated that the valve will open when the brake pedal is moved to apply the vehicle brakes if pneumatic control pressure is then present at the valve. When the valve opens to admit atmospheric air into the system it is also positioned to prevent the valve from closing upon brake release, thereby holding the valve open and preventing operation of the system until appropriate steps are taken to insure that the pneumatic control pressure is removed from the valve when the brake is applied so that the valve is not held in the open position.

IN THE DRAWING

FIG. 1 schematically illustrates a vehicle road speed control system having a valve assembly embodying the invention.

FIG. 3 is a view of the valve assembly similar to FIG. 2, showing the valve assembly when the brake is applied and the vent valve is closed, no subatmospheric pressure existing at the valve assembly.

FIG. 4 is a view of the valve assembly similar to FIG. 2, showing the valve assembly when the vent valve is open and the brake is released.

Figure 1:
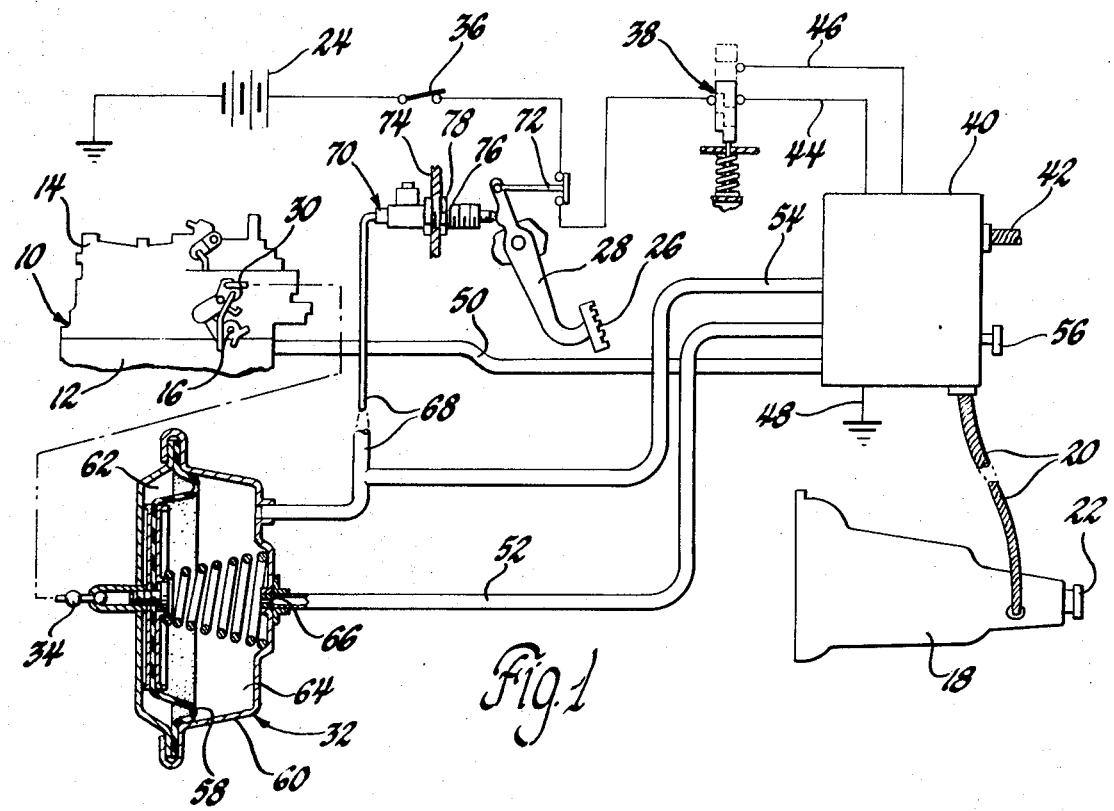

The engine 10 of a motor vehicle is schematically illustrated as having an intake manifold 12 to which is connected a carburetor 14 having a throttle valve 16, the shaft of which is shown extending out of the carburetor body. The vehicle is also schematically illustrated as having a transmission 18 with a vehicle speed pickup cable 20 connected to be driven by the transmission output shaft 22. The vehicle is also provided with a source of electricity such as battery 24, a brake pedal 26 mounted on a brake pedal arm 28, suitable throttle valve control linkage 30 connected for manual operation by the throttle valve 6, a differential pressure servomotor 32 connected by suitable linkage such as bead chain 34 to the throttle linkage 30 to operate the throttle valve 16, an ignition switch 36, a three-position manually operated switch 38, and a speed transducer assembly 40, which receives a vehicle speed signal through cable 20 and transmits this signal to the vehicle speedometer through the output cable 42.

The transducer assembly 40 is electrically connected to the holding circuit 44 and to the activation circuit 46, which circuits are also connected to switch 38, and is electrically grounded at 48. The transducer assembly is connected by conduit 50 to the engine intake manifold 12, by the conduit 52 to supply manifold vacuum to the servomotor 32, by conduit 54 to provide a speed error signal to the servomotor 32, and to a suitable atmospheric air inlet 56.

The servomotor 32 has a power wall 58 dividing the servomotor housing 60 into an atmospheric pressure chamber 62 and a variable pressure chamber 64. Chamber 64 is connected through an orifice 66 to conduit 52 and is also connected to conduit 54. Conduit 68 connects conduit 54 and therefore chamber 64 to the vacuum release valve assembly 70. This assembly is held in the valve closed position by the brake pedal arm 28 when that arm is in the released position. At the same time, a normally closed switch 72, in series in the electrical circuit with the battery 24, the ignition switch 36, and the manual switch 38, is connected to the brake pedal arm 28 so as to be opened when the brake pedal is moved in a brake applying direction.

Figure 2:
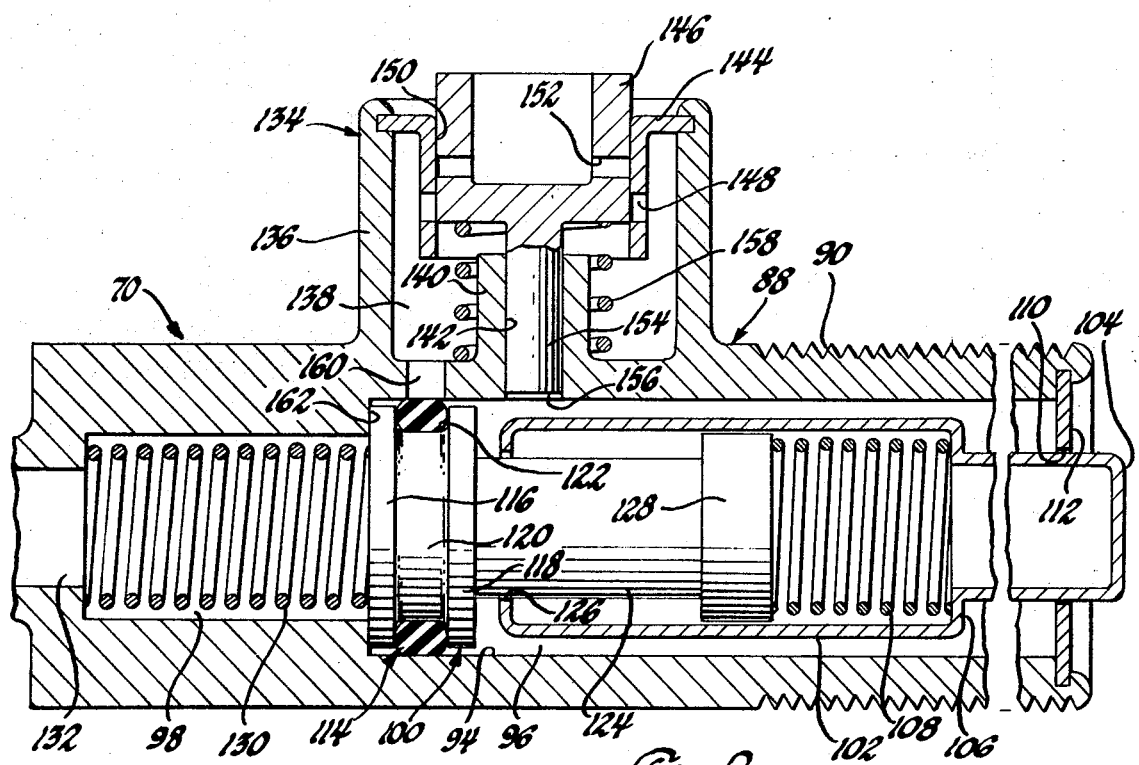
FIG. 2 is a cross section view, with parts broken away, of the valve assembly of FIG. 1 embodying the invention and showing the valve assembly when the brake is released and the vent valve is closed.

The valve assembly 70 and the means for mounting it are shown in greater detail in FIGS. 2, 3 and 4. The mounting means includes a bracket 74 suitably secured to a part of the vehicle frame adjacent the brake pedal arm 28 and having an aperture 76 extending therethrough. A retainer 78 is threaded on assembly 70 to hold it in the aperture 76. The valve assembly 70 has an elongated valve body 88 with the outer surface thereof being provided with threads 90 for this purpose.

The valve body 88 has a bore 94 extending therethrough with the larger section thereof providing a chamber 96 and a smaller section thereof providing the spring chamber 98.

The main valve assembly 100 includes a valve guide 102 reciprocably received in chamber 96. The valve guide end 104 joins the larger main body of the valve guide by means of a shoulder 106 which provides a seat for one end of the main valve spring 108. The valve guide end 104 extends through an aperture 110 provided in a retainer 112 fitting in the outer end of the chamber 96. The relationship of guide end 104 and aperture 110 is such that atmospheric air is always communicated to the outer end of chamber 96. The main valve 114 has an enlarged end or head formed by a pair of lands 116 and 118 separated by a groove 120 in which the valve ring 122 is received. This ring is of a suitable material such as a rubber-like compound, and may have an oval or other suitable cross-section. The main valve has a plunger 124 connected to the valve head and extending through aperture 126 formed in the other end of valve guide 102 from end 104. A land 128 on the other end of plunger 124 from lands 116 and 118 fits within the enlarged portion of valve guide 102 and engages the other end of spring 108. Another main valve spring 130 is received in spring chamber 98 and abuts land 116 and a shoulder at the outer end of the spring chamber. A port 132 in the outer end of chamber 98 is connected to conduit 68. Springs 108 and 130 are in compression, with spring 130 exerting a stronger force against the main valve 114 than does spring 108.

A vent valve assembly 134 is provided on one side of the valve body 88. The assembly includes an outer boss 136 formed as a part of the valve body and providing a vent valve chamber 138. An inner boss 140, also formed as a part of the valve body, extends into chamber 138 and has a bore 142 extending transversely of bore 94 and communicating with chambers 96 and 138. A valve guide 144 is secured within the outer end of chamber 138 and receives vent valve 146. Valve guide 144 has one or more ports 148 which connect chamber 138 with the inner cylindrical bore 150 formed by valve guide 144 and in which valve 146 is reciprocably received. Valve 146 has one or more similar ports 152, which in one axial position of valve 146, communicates atmospheric air therethrough and through ports 148 to chamber 138. This position is shown in FIG. 4. Another axial position of valve 146, which is the closed position of the valve, has ports 152 axially displaced so that ports 148 are blocked and atmospheric air is not communicated to chamber 138 through these ports. Valve 146 has a stem or plunger 154 which slidably fits within bore 142. When the vent valve 146 is in the closed position, the end 156 of plunger 154 does not extend into chamber 96. However, when ports 148 and 152 are aligned, as shown in FIG. 4, the plunger end 156 extends into chamber 96. A vent valve spring 158 is positioned about inner boss 140 and engages valve 146 so as to continually urge that valve to the axial position in which ports 148 and 152 are not in alignment, as shown in FIGS. 2 and 3. A port 160 in the valve body 88 provides passage means which extends through the portion of valve body 88 separating chambers 138 and 96 so as to fluidly connect those chambers. Port 160 is located adjacent the shoulder 162 which is formed on valve body 88 and separates the larger chamber 96 from the smaller chamber 98. Bore 142 is spaced from port 160 and is located on the side thereof axially opposite shoulder 162.

When the brake pedal arm 28 is in the brake released position, the valve guide end 104 is engaged by a portion of the pedal arm, as shown in FIG. 1, and the valve guide 102 is held in the position shown in FIG. 2. Spring 108 is compressed and the force transmitted therethrough urges main valve 114 leftwardly until land 116 engages shoulder 162, the force being exerted by the brake pedal arm being sufficient to compress spring 130 to the extent necessary. In normal operation, the vent valve assembly 134 remains closed. Also, the valve ring 122 seals or blocks port 160 in relation to port 132, as well as sealing bore 94 in chamber 96, so that no atmospheric air is admitted to conduit 68.

In normal operation, when the brakes are applied, pedal arm 28 is pivoted clockwise. Therefore, this permits valve guide 102 to move to the right under influence of spring 108 to the position shown in FIG. 3. This movement is limited by the engagement of shoulder 106 with retainer 112. Spring 130 moves the main valve 114 rightwardly since the force holding spring 130 in the position of FIG. 2 has been decreased until it is overcome by the force exerted by spring 130, so that valve ring 122 and land 116 are positioned rightwardly of bore 142. This connects port 132 through bore 94 and port 160 to chamber 138. However, in normal operation of the control system, a valve in the speed transducer assembly 40 also connects conduit 54 to atmospheric vent 56 so that atmospheric pressure exists in conduit 68. The details of operation of this portion of the speed transducer assembly 40 are typical of that disclosed in U.S. Pat. No. 3,419,105, entitled "Vehicle Road Speed Control System," issued Dec. 31, 1968 and assigned to the common assignee. Therefore, vent valve assembly 134 will remain closed as shown in FIG. 3 since there is no pressure differential acting across valve 146 to move the valve against the force of spring 158.

If for some reason the communication of conduit 54 to atmospheric pressure is not accomplished by the speed transducer assembly 40 when the brakes are applied, vacuum will remain in conduit 68 while the main valve 114 and its guide 102 move to the position shown in FIG. 3. The vacuum will, therefore, be connected to chamber 138 through port 160 and will act on vent valve 146 against the force of spring 158 to move the valve downwardly until ports 148 and 152 connect chamber 138 with atmospheric air. This will increase the pressure to some extent in conduit 68 and, therefore, a higher pressure approaching atmospheric air pressure will enter chamber 64 so as to permit the throttle valve to move in the closing direction.

A slight pressure differential will be retained in chamber 64 and conduit 68 due to the tendency of the vent valve to modulate the opening between ports 148 and 152 to balance the opposed forces of the pressure differential across valve 146 and the spring 158. The length of valve stem or plunger 154 is such that when there is any fluid connection at or between the ports 148 and 152, the plunger will extend into chamber 96 sufficiently to be engageable by the end of valve guide 102 when the brake pedal is released. Therefore, the valve land 116 will engage plunger 154 as shown in FIG. 4 so that the vent remains open to atmosphere even after the brakes are released. Therefore, the valve design will allow the vent valve to continue its venting action after the brakes are released and appropriate steps are made to correct the action of the transducer vent arrangement. Should the brake pedal be depressed when there is no source of vacuum available, such as when the vehicle engine is not running, the vent valve will be released and returned to the position shown in FIG. 3. Upon brake pedal release, the valve assembly will return to the position shown in FIG. 2. However, if the control system is again energized and operating, and the brake pedal is again depressed, the same action will occur to insure venting. While the valve assembly is in the condition as shown in FIG. 4, the control system cannot be rendered operative to control vehicle speed. This inability to engage the system will alert the operator to have the system checked and repaired and at the same time have no deleterious effect on engine or vehicle operation.

What is claimed is:

1. A fluid control valve assembly adapted to be actuated by movement of a control member such as a brake pedal in conjunction with the presence of a fluid pressure differential in said valve assembly, said assembly comprising:

a valve body having a first valve chamber, a first bore including a second valve chamber, a second bore extending therebetween and transversely intersecting said second valve chamber, a fluid inlet communicating with said first valve chamber, a fluid outlet communicating with said second valve chamber and spaced from said second bore, and a port fluidly connecting said first and second valve chambers with the opening of said port into said second valve chamber being at least, axially of said first bore, as close to said outlet as said second bore;

a normally closed first valve reciprocably received in said first valve chamber and positionable to control the opening and closing of said fluid inlet in response to a pressure differential impressed across said valve;

said first valve having a stem extending into said second bore and, when said first valve opens said inlet, extending into said second valve chamber and, when said first valve closes said inlet, being retracted from said second valve chamber;

a second valve reciprocably received in said second valve chamber and having a first position closing said fluid outlet from fluid communication with said port and a second position axially spaced and past said second bore from said first position and fluid connecting said fluid outlet and said port to communicate the fluid pressure of said fluid outlet to said first valve chamber;

opposed spring means acting on said second valve member urging same toward said second position;

and means acting on one of said springs in response to movement of a control member such as a brake pedal to selectively oppose the other of said springs to move said second valve member from said second position toward said first position;

said first valve stem, when extending into said second valve chamber under influence of the pressure differential acting on said first valve, blocking and holding said second valve in a position which maintains communication to said first valve chamber from said fluid pressure outlet through said port, and said second valve engaging said stem with a force exerted by said one spring to hold said first valve in the fluid inlet open position.

2. A fluid valve assembly having first and second pressure access ports, the first of which is subject to pressure variances in a range equal to and less than the pressure to which the second is subject, said valve assembly comprising:

first valve means;

passage means controlled by said first valve means and selectively fluid communicating and fluid blocking said first access port to said second access port under influence of a control member;

second valve means controlling the opening and closing of said second access port in response to a predetermined pressure differential at said access ports when said passage means is open;

and holding means responsive to the opening of said second access port by said second valve means and to movement of said first valve means toward the passage means fluid blocking position to operatively engage said first valve means and said second valve means through said holding means when said passage means is opened and thereafter said second access port is opened, to maintain fluid communication between said access ports;

and means selectively operatively disengaging said holding means from said first valve means.

* * * * *